(12) United States Patent
Dressler et al.

(10) Patent No.: US 8,074,118 B2
(45) Date of Patent: *Dec. 6, 2011

(54) METHOD FOR INFLUENCING A CONTROL UNIT AND MANIPULATION UNIT

(75) Inventors: Marc Dressler, Horn (DE); Daniel Hofmann, Paderborn (DE); Bastian Kellers, Paderborn (DE); Thorsten Hufnagel, Paderborn (DE)

(73) Assignee: dSpace digital signal processing and control engineering GmbH, Paderhorn (DE)

( * ) Notice: Subject to any disclaimer, the term of this patent is extended or adjusted under 35 U.S.C. 154(b) by 102 days.

This patent is subject to a terminal disclaimer.

(21) Appl. No.: 12/475,934

(22) Filed: Jun. 1, 2009

(65) Prior Publication Data

US 2010/0192015 A1    Jul. 29, 2010

(30) Foreign Application Priority Data

Jan. 28, 2009  (DE) .......................... 10 2009 006 517

(51) Int. Cl.
*G06F 11/00* (2006.01)
(52) U.S. Cl. ........................................................ 714/45
(58) Field of Classification Search ...................... 714/45
See application file for complete search history.

(56) References Cited

U.S. PATENT DOCUMENTS

| | | |
|---|---|---|
| 5,490,064 A | 2/1996 | Minowa et al. |
| 5,638,272 A | 6/1997 | Minowa et al. |
| 5,740,199 A * | 4/1998 | Sibigtroth .................... 375/219 |
| 5,794,165 A | 8/1998 | Minowa et al. |
| 5,894,549 A * | 4/1999 | Cheng .............................. 714/42 |
| 5,968,100 A | 10/1999 | Kayano et al. |
| 5,978,937 A | 11/1999 | Miyamori et al. |
| 6,009,370 A * | 12/1999 | Minowa et al. ............... 701/102 |
| 6,209,045 B1 * | 3/2001 | Hasegawa et al. .............. 710/15 |

(Continued)

FOREIGN PATENT DOCUMENTS

DE     19536490 A1    4/1997

(Continued)

OTHER PUBLICATIONS

Office Action for German Application Serial No. 2009 006 517.2-53; mailed on Dec. 22, 2009.

(Continued)

*Primary Examiner* — Amine Riad
(74) *Attorney, Agent, or Firm* — Orrick, Herrington & Sutcliffe, LLP

(57) ABSTRACT

A method for influencing a control unit by means of a manipulation unit whereby the control unit has at least one microcontroller, at least one memory having a plurality of memory cells and at least one debug interface, and the debug interface has a monitoring functionality for observing the memory content, and by means of the debug interface a first point in time of the control unit for writing a first value to a first memory cell is detected, and a triggering point in time for a processing routine by the manipulation unit is obtained as the result based on the information transmitted to the manipulation unit by the debug interface at the first point in time, and at a second point in time, a second value is written to the first memory cell by the manipulation unit by means of the processing routine via the debug interface before the first memory cell is read by the control unit at a third point in time.

10 Claims, 1 Drawing Sheet

U.S. PATENT DOCUMENTS

Figure 1:
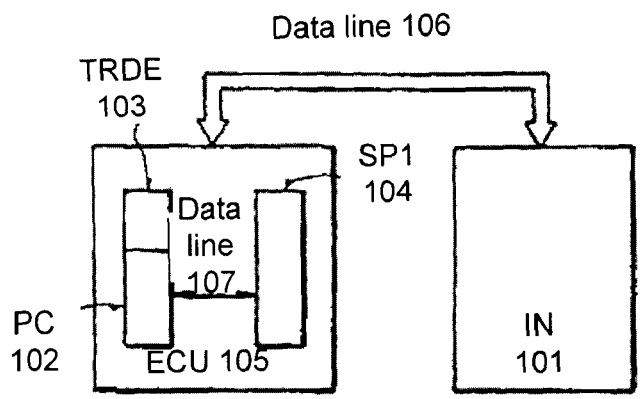

| | | | |
|---|---|---|---|
| 7,042,913 B2 * | 5/2006 | Jarabek et al. | 370/506 |
| 7,080,283 B1 * | 7/2006 | Songer et al. | 714/30 |
| 7,089,097 B2 | 8/2006 | Sakurai et al. | |
| 7,522,369 B1 * | 4/2009 | Rahgozar et al. | 360/75 |
| 7,577,878 B2 * | 8/2009 | Baradie et al. | 714/45 |
| 2002/0144235 A1 | 10/2002 | Simmers et al. | |
| 2003/0051192 A1 * | 3/2003 | Pillay et al. | 714/39 |
| 2004/0249986 A1 | 12/2004 | Minowa et al. | |
| 2005/0022067 A1 * | 1/2005 | Baradie et al. | 714/45 |
| 2005/0071594 A1 * | 3/2005 | Jarabek et al. | 711/167 |
| 2006/0206241 A1 | 9/2006 | Minowa et al. | |
| 2008/0162900 A1 | 7/2008 | Rolfsmeier et al. | |

FOREIGN PATENT DOCUMENTS

| | | |
|---|---|---|
| DE | 10303490 A1 | 8/2004 |
| DE | 60019750T2 B1 | 9/2005 |
| DE | 10 2004 027 033 A1 | 10/2005 |
| DE | 102004027033 A1 | 10/2005 |
| DE | 10 2004 041 523 A1 | 3/2006 |
| DE | 10 2006002354 A1 | 7/2007 |
| DE | 102006002354 A1 | 7/2007 |
| DE | 10 2006 062 555 A1 | 7/2008 |
| DE | 102007017865 A1 | 11/2008 |
| DE | 10 2009 056 758 A1 | 7/2010 |
| DE | 2009056758 A1 | 7/2010 |
| WO | WO 00/43885 A1 | 7/2000 |
| WO | WO 2005/041041 A2 | 10/2003 |
| WO | WO 2005/045538 A1 | 5/2005 |

OTHER PUBLICATIONS

Calibration and Bypassing Hardware, Catalog 2008, dSpace, Technologiepark 25, 33100 Paderborn Germany, info@dspace de, www.dspace.com, pp. 472-488.

Function Prototyping, dSpace Prototyping Systems, Catalog 2008, dSpace, Technologiepark 25, 33100 Paderborn, Germany, info@dspace de, www.dspace.com, pp. 46-53.

Germany Search Report 10 2009 058 652.0, Sep. 30, 2010 with machine English translation thereof.

Debugger, Wikipedia http://de.wikipedia.org/w/index.php?title=Debugger&oldid=67287633, Aug. 24, 2010 with English translation thereof.

U.S. Appl. No. 12/695,813 Office Action dated Jul. 6, 2011.

U.S. Appl. No. 12/795,791 office Action dated Jul. 11, 2011.

* cited by examiner

METHOD FOR INFLUENCING A CONTROL UNIT AND MANIPULATION UNIT

FIELD

The present invention relates to a method for influencing a control unit and a manipulation unit.

BACKGROUND

Control units are used in large numbers in many fields of technology. One especially important field of application is for engine control in automobiles and for controlling the jet engines of aircraft.

A method for influencing a control unit is known from the document DE 10 2004 027 033 A1. Data of the control unit is mirrored in the memory area of the influencing device by means of an influencing device using a control unit-debug interface and a memory area embodied in the influencing device, and data is also mirrored back into the memory of the control unit, again using the control unit-debug interface. In one embodiment, the data is received by a coordination unit in the influencing device and is provided with a time stamp for a chronological classification. In addition, the coordination unit has terminals for internal and external trigger signals by means of which it is possible to activate corresponding sub-units in the influencing device and to trigger a bypass routine, for example.

The document DE 10 2006 062 555 A1 discloses a method for observing a control unit in which an influencing device for observation of a control unit comprises at least one microcontroller, at least one memory and at least one debug interface. With the debug interface, which has a so-called trace functionality, it is possible to monitor addresses to be observed.

From the previous methods, it has been found that manipulation of control unit functions is time-consuming and is often performed via a so-called external bypass method, in which interrupt processing in an external manipulation device is prompted by the control unit by means of trigger pulses transmitted outward in the execution of the program by means of service calls that are fixedly defined in the program of the control unit. As part of the interrupt processing, the additional values needed for calculation are transmitted to the manipulation device. After the calculation in the manipulation device, the altered variables are sent back to the control unit. Since the service calls are fixedly tied into the program code of the control unit, any subsequent change in the service call points is very complicated and can be performed subsequently only with a great expenditure of effort, depending on the control unit manufacturer, because a pre-existing control unit program would have to be translated again, for example. Furthermore, the size of the memory required is increased by the service call points, which has a negative effect on the processing rate of control unit programs.

SUMMARY

A method is described for influencing a control unit by means of a manipulation unit, whereby the control unit has at least one microcontroller, at least one memory with a plurality of memory cells and at least one debug interface, said debug interface having a monitoring functionality for observing memory contents, and by means of the debug interface, a first point in time of the control unit for writing a first word to a first memory cell is detected, and a triggering point in time for a processing routine by the manipulation unit is obtained as the result via the information transmitted from the debug interface to the manipulation unit at a first point in time, and at a second point in time, a second value is written to the first memory cell by the manipulation unit by means of the processing routine via the debug interface before the first memory cell is read by the control unit at a third point in time.

DESCRIPTION

A method is described for influencing a control unit by means of a manipulation unit, whereby the control unit has at least one microcontroller, at least one memory with a plurality of memory cells and at least one debug interface, said debug interface having a monitoring functionality for observing memory contents, and by means of the debug interface, a first point in time of the control unit for writing a first word to a first memory cell is detected, and a triggering point in time for a processing routine by the manipulation unit is obtained as the result via the information transmitted from the debug interface to the manipulation unit at a first point in time, and at a second point in time, a second value is written to the first memory cell by the manipulation unit by means of the processing routine via the debug interface before the first memory cell is read by the control unit at a third point in time.

The object of the present invention is to provide a method by means of which a control unit can be influenced advantageously. An additional object of the present invention is to provide a manipulation unit for implementing the method.

According to a second aspect of the present invention, a manipulation unit which is equipped for influencing a control unit is provided, said control unit having at least one microcontroller, at least one memory and at least one debug interface. In addition, the debug interface has a monitoring functionality for observing memory contents and is equipped to detect a first point in time of writing to a first memory cell and to transmit the respective first value to the manipulation unit, and the manipulation unit is equipped to prompt a processing routine to be run on the basis of the point in time transmitted and to determine a second value by means of the processing routine and to write the second value to the first memory cell at a second point in time via the debug interface installed, to write the second value to the first memory cell at a second point in time before the first memory cell is read by the control unit.

One advantage of this method is that by means of the manipulation unit, writing of values to memory cells of the control unit is detectable independently of service calls at any program points and at any points in time, and subsequently the values in the respective memory cells can be changed. The inventive method is thus extremely flexible in handling and can be used in a plurality of control units from different manufacturers without a knowledge of the respective source code of the control unit program in particular. Furthermore, no adjustments in the control unit program are required. Since the corresponding service calls with the associated program parts are not necessary with the programs for the control unit, a disadvantageous influence on the program processing and memory use can be avoided.

In a further embodiment of the method, the manipulation unit investigates and/or monitors whether the second point in time is or was before the third point in time and, depending on the result of the investigation, a predefined value is output. This makes it possible to detect the success of influencing, i.e., promptly overwriting memory cells and informing the user. The monitoring and output are advantageously performed by a service program which is implemented in the manipulation unit.

In another preferred embodiment, the length of time required by the control unit for writing the first value to the first memory cell and reading the first memory cell is determined by the control unit. According to a further embodiment, the determination of the length of time of a read/write access to a defined memory cell is performed by analysis of the program code of the control unit. To do so, program code executed in the control unit is analyzed by tracking by the microcontroller. The analysis of the program code is preferably performed without using the control unit by performing the analysis on an external device, in particular a PC. The relevant points in time are preferably determined by means of a sequential analysis of the respective command set, the so-called instruction code. With the help of a typical implementation time for each command, which can be determined on the basis of the type of processor and the clock frequency used, the minimum length of time between the individual read-write accesses is extracted. One advantage of this embodiment is that a determination of the length of time can also be performed in advance independently of execution of the control unit program under real conditions, such as those occurring in an installed state in a motor vehicle, for example. This makes it possible to reduce the risk of malfunctions due to a defective overwrite, in that the lengths of time of all read-write accesses occurring are investigated and a check is performed to determine to what extent the execution time of the manipulation unit is sufficient to overwrite the respective values from the manipulation unit to the respective memory cells. If the control unit is not built-in, a check can also be performed by means of a virtual test environment and/or a simulator, i.e., data comparable to real conditions is made available to the control unit at its interfaces.

According to another preferred embodiment, the length of time required by the control unit is determined by the manipulation unit by means of the monitoring functionality of the debug interface. In another embodiment, the determination of the points in time may be performed more or less online, i.e., in real operation of the control unit, and then it is also possible to decide, during real-time operation of the control unit, which memory cell is being written with a second value by the manipulation unit.

According to another embodiment, the memory cells of the control unit that can be influenced can be output by a service program by the manipulation unit on the basis of the size of the intervals in time of the read-write accesses occurring in the control unit. In this way, the user has the option of determining, preferably in advance, certain memory cells suitable for influencing in a highly targeted manner.

Figure 2:
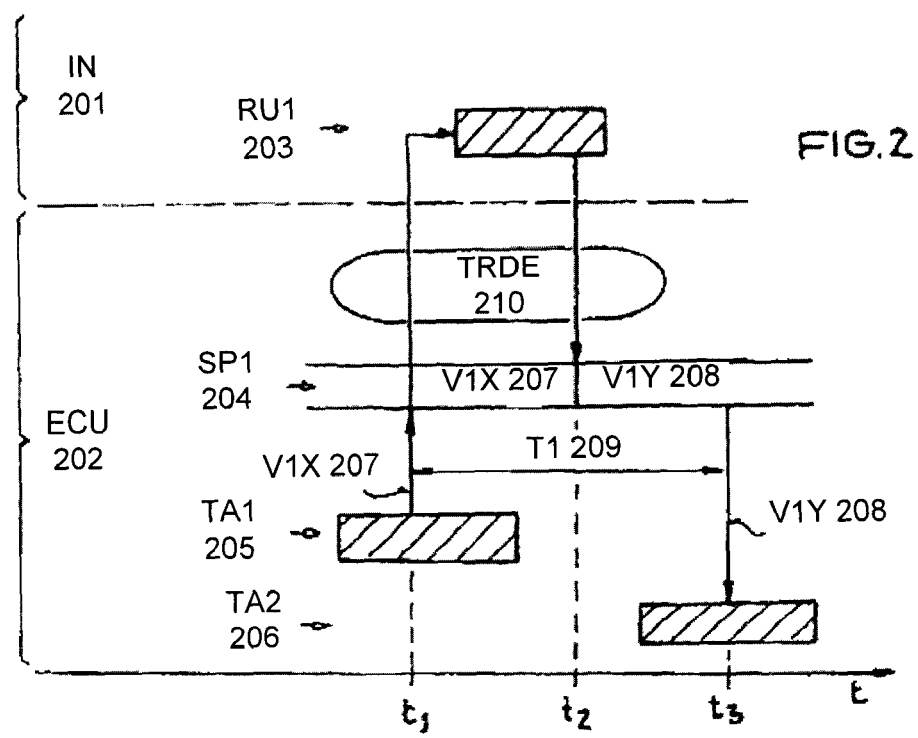

The inventive method is explained below on the basis of the exemplary embodiments in conjunction with the schematic drawings, in which:

FIG. 1 shows a schematic diagram of a manipulation unit connected to a control unit, and FIG. 2 shows a schematic diagram of a chronological sequence for making a change in data within the control unit by the manipulation unit of FIG. 1.

According to the illustration in FIG. 1, a manipulation unit IN 101 is wired by means of a data line 106 connecting it to a control unit ECU 105. In addition, the control unit ECU 105 has a microcontroller PC 102 with a debug interface TRDE 103, which includes a monitoring functionality (trace functionality). The microcontroller PC 102 and the debug interface TRDE 103, which is preferably embodied as an integral component of the microcontroller, are connected to a memory SP1 104 by a data line 107. The memory is preferably implemented as a component of the microcontroller. Different service programs in general and a processing routine in particular are implemented in the manipulation unit IN 101 (not shown).

The diagram in FIG. 2 illustrates a detailed chronological sequence for influencing a memory cell by cooperation of the manipulation unit IN 201 with the debug interface TRDE 210 of the control unit ECU 202 of FIG. 1. To do so, the chronological sequence of the steps shown here is plotted as a function of a time axis t. In the control unit ECU 202, a first task TA1 205 is performed by the control unit program, and a first value V1X 207 is written at a first point in time t1 to a first memory cell of the memory SP1 204 within the context of the processing of the first task TA1 205. The writing of the first value V1X 207 at a first point in time t1 is transmitted together with the value V1X 207 by means of the debug interface TRDE 210 to the manipulation unit IN 201. In the manipulation unit IN 201, a triggering point in time is determined based on the information transmitted; on the basis of this triggering point in time, a processing routine RU1 203 is initiated and processed. By means of the processing routine RU1 203 and the debug interface TRDE 210, at a second point in time t2, a second value V1Y 208 is written by the manipulation unit IN 201 to the first memory cell SP1 204 before that memory cell is read by the control unit ECU 202 at a third point in time t3 during the processing of a second task TA2 206.

The invention claimed is:

1. A method for influencing a control unit by a manipulation unit, the control unit having a microcontroller, a memory having a plurality of memory cells and at least one debug interface, the debug interface having a monitoring functionality for observing memory content, the method comprising:
   detecting a first point in time at which a first value is written to a first memory cell, wherein the detecting is performed by the debug interface,
   obtaining, by the manipulation unit, a triggering point in time for a processing routine, wherein the triggering point is obtained based on information transmitted to the manipulation unit by the debug interface at the first point in time, and
   writing a second value to the first memory cell at a second point in time, wherein the second value is written to the first memory cell by the manipulation unit via the debug interface by using the processing routine, and wherein the second value is written to the first memory cell before the first memory cell is read by the control unit at a third point in time.

2. The method according to claim 1, further comprising:
   determining a result, by the manipulation unit, wherein the result indicates whether the second point in time is before the third point in time and,
   depending on the result, outputting a predefined value.

3. The method according to claim 1, further comprising:
   determining a length of time required by the control unit for writing the first value to the first memory cell and reading the first memory cell by the control unit.

4. The method according to claim 3, wherein the determining is performed by analysis of program code of the control unit.

5. The method according to claim 4, wherein the analysis of the program code is performed without using the control unit.

6. The method according to claim 3, wherein the length of time required by the control unit is determined by the manipulation unit by using a monitoring function of the debug interface.

7. The method according to claim 3, wherein the memory cell of the control unit is output by the manipulation unit based on a size of intervals of read-write accesses occurring in the control unit.

8. A manipulation unit for influencing a control unit, wherein the control unit has a microcontroller, a memory and a debug interface, the debug interface having a monitoring functionality for observing memory content, wherein the debug interface is configured to detect a first point in time of writing to a first memory cell and to transmit a first value to the manipulation unit, the manipulation unit being configured to:
   allow a processing routine to run on the basis of the first point in time,
   determine a second value by the processing routine, and
   write the second value at a second point in time to the first memory cell via the debug interface before the first memory cell is read by the control unit.

9. A method for influencing a control unit, the control unit having a microcontroller, a memory cell and a debug interface, the debug interface having a monitoring functionality for observing memory content, the method comprising:
   detecting when a first value is written to the memory cell at a first point in time;
   transmitting information indicative of the first value and the first point in time to a manipulation unit;
   determining, based on the transmitted information, a triggering point for initiating a processing routine; and
   writing, based on the processing routine, a second value to the memory cell at a second point in time, wherein the second value is written to the memory cell before the memory cell is read by the control unit at a third point in time.

10. A system, comprising:
   a control unit having a microcontroller, a memory cell, and a debug interface, the debug interface having a monitoring functionality for observing memory content; and
   a manipulation unit in communication with the control unit, the manipulation unit having a processing routine, wherein the manipulation unit is configured to
   receive information indicative of a first value written to the memory cell and a first point in time at which the first value was written;
   determine a triggering point, based on the information, for initiating the processing routine; and
   write, based on the processing routine, a second value to the memory cell at a second point in time, wherein the second value is written to the memory cell before the memory cell is read by the control unit at a third point in time.

* * * * *